Patented Apr. 9, 1946

2,398,071

UNITED STATES PATENT OFFICE 2,398,071

AMMONIUM NITRATE EXPLOSIVES

Jacob Barab, Wilmington, Del.

No Drawing. Application July 24, 1940,
Serial No. 347,201

6 Claims. (Cl. 52—14)

My invention relates to $NH_4NO_3$ explosives and more particularly to such compositions of $NH_4NO_3$ having particles of extreme fineness that are coated or in intimate contact with carbonaceous materials or other combustible substances of extreme fineness or as applied in a very thin coating.

It is known that even the finest commercial granulation of $NH_4NO_3$ in use in the manufacture of explosives has a particle size that is defined by passing 100% through 40 mesh screen and not more than 50% through 100 mesh screen. When dynamites using high percentages of $NH_4NO_3$ of even the finest commercial granulation of $NH_4NO_3$ the strength obtained, determined by the ballistic pendulum, will vary depending on the percentage of nitroglycerin used. In certain dynamites, with 10% or less of nitroglycerin, the ballistic value for $NH_4NO_3$ will be less than .7 but will go as high as .7 if sufficient nitroglycerin is used in the dynamite. In other words, the useful energy developed by $NH_4NO_3$, where an explosive such as nitroglycerin is used as a sensitizer, is a function of the concentration of the nitroglycerin.

$NH_4NO_3$ even of the aforesaid degree of fineness has a pronounced tendency to cake or set up in intimate mixtures in which the fineness of the $NH_4NO_3$ particle has approached the extreme limit of the commercially small size adapted to incorporation with other components.

In my invention, however, the terms "extreme fineness or intimate contact or incorporation" assume an entirely different significance in view of the extraordinary qualities exhibited by particles lying close to or within the colloidal realm. The components of my explosive compositions approach in a large proportion particle size of colloidal dimensions and accordingly acquire novel and active properties which are denied the same components in a state of granulation responding to the utmost commercial criteria now in use.

The objectives of my invention reside in the incorporation of the $NH_4NO_3$ with other components of our composition in such a manner that there is a far greater surface of actual contact between the $NH_4NO_3$ and the combustibles than is used in the conventional manufacture of explosives. This increased surface contact can only be obtained by a much greater fineness of the ingredients. It will also be obvious that the necessary fineness of the various ingredients will vary depending on whether the combustible consists of only solid ingredients or of only liquid ingredients, or combinatively of liquids and solids.

Intimacy of contact between $NH_4NO_3$ and the combustible to a much higher degree than is used in regular practice is the basis of my discovery. When all of the ingredients are solid, then the surface area of the $NH_4NO_3$, because of its much higher percentage, is vastly greater than for the combustible. I therefore find that when exclusively solid combustibles are used, the $NH_4NO_3$ must be possessed of its greatest degree of fineness and a large proportion of it must approach colloidal magnitude. Where a liquid combustible is present, the liquid film coating itself on the $NH_4NO_3$ particles may well approach molecular thickness and, as a result, the $NH_4NO_3$ need not be reduced to so great a degree of fineness as in the case of a composition using solid combustibles. I find that when a liquid combustible is used (at least in part), $NH_4NO_3$ of a fineness between 100 and 200 mesh is sufficient. In particular, when a combustible such as liquid dinitrotoluene is used, I have discovered any particles of $NH_4NO_3$ coarser than those which would pass through 100 mesh screen are not very effective; and, therefore, under any conditions it becomes necessary to have most of the $NH_4NO_3$ pass through a 100 mesh screen. Accordingly, it is my definite observation that at least 75% of the $NH_4NO_3$ must pass through 100 mesh screen.

But when the combustible is entirely in the solid phase, I find that at least 75% of the $NH_4NO_3$ must pass through a 200 mesh screen.

When the combustible is partly liquid and partly solid, then the fineness of the $NH_4NO_3$ particles approximates more closely the specifications necessary in the case of liquid combustibles.

The aforesaid specifications are the most important requirements of my novel compositions to obtain explosives that can be detonated by a No. 6 or 8 cap. A higher degree of fineness is not only desirable, but produces a more readily detonatable composition of a somewhat greater strength.

Although the degree of fineness of $NH_4NO_3$ may vary through a wide range yet under no circumstances can I satisfactorily use $NH_4NO_3$ of the finest commercial specifications, viz: 100% through 40 mesh and not over 50% through 100 mesh. Extreme intimacy of contact between $NH_4NO_3$ and combustibles is the essence of my invention. A lesser intimacy will either be nondetonatable or will require a stronger primer than a No. 6 or a No. 8 cap—that is, it will require a booster charge even if the composition is explodable. As a matter of fact, the degree of fineness or the intimacy of contact that is necessary in my invention is determined by the capacity of the mixture to be detonated by a No. 6 or No. 8 cap. To illustrate with actual compositions, I submit the following:

| | Per cent |
|---|---|
| $NH_4NO_3$ | 95 |
| Coal | 2 |
| Carbon black | 1 |
| Dinitrotoluene (oily) | 2 |

If the $NH_4NO_3$ in the aforesaid composition is of the following fineness:

| | Per cent |
|---|---|
| On 60 mesh | 5 |
| On 100 mesh | 30 |
| On 200 mesh | 40 |
| Through 200 mesh | 25 | then a No. 6 cap will not regularly detonate it; and, if it does, it will not propagate in its full strength. However, $NH_4NO_3$ of the following degree of fineness:

| | Per cent |
|---|---|
| On 60 mesh | 0 |
| On 100 mesh | 8 |
| On 200 mesh | 92.0 |
| Through 200 mesh | 0 | is readily detonatable by means of a No. 6 or 8 cap.

When the percentage of dinitrotoluene is increased, then the fineness of $NH_4NO_3$ is not so significant and a coarser material may be used. However, even under such circumstances the full energy of the composition is not developed if the $NH_4NO_3$ should be too coarse.

In the case of an exclusively solid combustible, the degree of fineness just referred to is entirely unsuitable since a large portion of the $NH_4NO_3$ in association with the solid combustible must pass through a 200 mesh screen and in many instances at least 75% must pass through a 200 mesh screen.

It is therefore apparent that when a liquid is used in part as the combustible, the liquid can coat the particles of $NH_4NO_3$ with a thin film and thus avoid the necessity of reducing the $NH_4NO_3$ to the particle size required by the use of a solid combustible. When no liquid is used, then the surface contacts between the solid particles of the combustible and the particles of $NH_4NO_3$ must be increased by reducing all of the solid components of the composition to a greater degree of fineness. As mentioned, in such instances, at least 75% of the solid particles must pass through a 200 mesh screen. If the $NH_4NO_3$ is of a coarser granulation, then a stronger detonator or primer becomes necessary.

It is known that $NH_4NO_3$, either alone or intermixed with combustible or oxidizing materials and sufficient quantities of substances such as Al, FeSi, T. N. T., and other nitro-aromatic compounds and the like, forms explosives that are detonatable by means of a No. 6 or No. 8 cap.

It is also known that explosive mixtures of $NH_4NO_3$ can be prepared with combustibles such as carbon, hydrocarbons, carbohydrates, resins and nitro-aromatics, either separately or in various combinations. However, these mixtures are of such reduced sensitiveness that even though they may shoot with a No. 6 or 8 cap under certain specific conditions, yet they do not propagate readily through the long lengths of all commercial diameters and are not sufficiently dependable to produce a maximum strength under normal conditions of use.

It is known also in the art that an $NH_4NO_3$ explosive containing combustible and nitro-aromatic compounds can be so regulated that they cannot be exploded by the ordinary blasting caps but require a booster charge for their detonation, provided the cross sectional area of the mass is at least three square inches.

In actual practice, I have discovered that all of the aforesaid explosives present seriously objectionable features. In my application, No. 242,453, filed November 22, 1938, I have recited certain corrective measures to combat these objections, but in the instant application I shall disclose additional specific details and conditions that have been determined subsequently to the filing of the aforesaid application and are indispensable to a complete operability of my compositions and methods.

Referring again to conventional compositions, especially those in which nitroglycerin or nitrostarch are incorporated as sensitizers, their high degree of sensitivity to impact, friction and flame causes them to become a precarious hazard when handled in actual use. Furthermore, the mandatory precautions that must be observed in their manufacture necessitate considerable expenditures for the erection and the operation of suitable plants. On the other hand, when combustible materials or non-explosive nitro-aromatics are employed as sensitizers for shooting with ordinary caps, the results obtained are uncertain and the strength developed is low, even though the costs of the nitro-aromatics are comparatively high. In the case of extremely insensitive explosives, the use of awkward and expensive primers becomes imperative and even then their application is restricted to only masses of large diameter. In the patent literature, an $NH_4NO_3$ explosive of such an insensitivity is described and its detonation can be effected only by a sensitive explosive core running throughout its entire length.

One of the objects of my invention is to produce an explosive that in use for specific or general purposes eliminates the objectionable features of hazardous handling, of low and variable explosive results, and the use of expensive or continuous primers and misfires when detonated in the proper manner with No. 6 or No. 8 caps.

Another object of my invention is to produce a simple and inexpensive explosive that can be detonated by the conventional No. 6 or No. 8 detonating cap. Additional advantages will become apparent as my invention is described more fully hereinafter.

With my invention, insensitive explosive mixtures which by the usual methods of manufacture do not shoot with a No. 6 or No. 8 cap will then readily do so. Also in the patent literature, the statement runs: "We find a satisfactory composition to result when relative proportions are selected of 92% $NH_4NO_3$ and 5 to 8 parts of coal. For such use, the ingredients of this mixture should be thoroughly incorporated so that there is intimate contact between the particles of the two ingredients." According to the patentees, this combination will not detonate by means of a No. 6 or No. 8 cap. Furthermore, the patentees state: "As a matter of fact our explosive compositions will fail to detonate with several No. 8 caps fired simultaneously, or even a No. 9 or a No. 10 cap." Yet, by means of my invention the previously cited composition will readily detonate with a No. 6 cap, although the patentees by their methods fail to set it off by firing several No. 8 caps simultaneously.

By the application of my methods, other mixtures which shoot in a normal manner, e. g., 90% NH4NO3 and 10% dinitrotoluene, can have their dinitrotoluene content materially reduced and at the same time have superior results produced.

The aforesaid objectives of my invention reside in the incorporation with other components of the explosive compositions of NH4NO3 in a state of extremely fine subdivision. As the principal component of my explosive combinations, the NH4NO3 is reduced or produced by several methods to the necessary degree of fineness. The many extremely fine particles of NH4NO3 are then coated or brought into very intimate contact with a combustible that forms a layer or sheath largely of approximately molecular or colloidal thickness or in reverse order, i. e., NH4NO3 forms a coating on combustible or partly both. This degree of thickness is all that is required, but a greater thickness may be used. In reference to coating, the important requirement is to have large surface areas in contact.

My experimental work has proved that an explosive made in accordance with such requirements offers the ultimate in its speed of reaction and, accordingly, is capable of furnishing a maximum explosive energy in addition to offering the assurance of a complete propagation of long lengths in all commercial diameters.

The fact that the aforesaid extreme fineness of the NH4NO3, etc., endows the mixture of components with entirely new properties, also makes it imperative to provide and to maintain special conditions during the manufacture of the components of the compositions of my invention. Even minute quantities of moisture adversely affect the characteristics of these explosives so that it becomes necessary to obtain a very low moisture content for all of the ingredients and to maintain the humidity of the air in contact with the NH4NO3 before and after mixing at a point below which it cannot absorb a moisture content beyond .15% and for the finished product, .2%. As an illustrative example, in order to obtain these conditions, the relative humidity must be kept below 40% at 70° F. to prevent undue moisture absorption by the NH4NO3.

In the production of regular dynamites, a moisture content of the finished product of .75% is allowed and no effort is made to reduce this below 0.5%.

The drying of NH4NO3 must take place after it is in a state of fairly fine subdivision, contrary to the customary method of drying before grinding. Otherwise, there may be sufficiently occluded moisture in the coarser material so that, on grinding it is released to an extent that causes a caking or a setting up of the NH4NO3 in the mixed materials with a resulting insensitiveness to detonation by a No. 6 or No. 8 cap.

If my explosives are tested shortly after they have been prepared and packed, the selection of the combustibles and the fixing of a low moisture content for the finished explosive are not of paramount importance, provided the total moisture content is kept below 0.3%. However, in regular practice, it is necessary to store explosives for indeterminate periods under widely varying conditions of temperature and humidity. To prevent an undesirable physical change in the explosives of my invention it is strictly necessary to reduce and to maintain the moisture content below 0.20%. In choosing the combustibles, it is preferable to use in part at least one that acts as an anti-setting agent such as carbon black.

After manufacture, the explosives must be packed in sealed containers so that any subsequent entrance of moisture will be prevented.

If the moisture content exceeds the aforesaid limits, then, with variations in temperatures, alternate solution and crystallization will take place of the fine ammonium nitrate; and ultimately the entire contents will appear to form a single, solid cake. In this form it becomes less sensitive to detonation; and will require a stronger detonator and may, indeed, become unresponsive to detonation at all.

When a fine NH4NO3 is obtained by grinding a coarse NH4NO3, it is necessary to dry the NH4NO3 after grinding, because even though the coarse NH4NO3 is apparently very dry, yet it may contain—as was previously mentioned—an occluded moisture that is released on grinding and necessitates a drying operation after such a grinding. If coarse NH4NO3 is dried previously and ground, sufficient moisture may be released by grinding to cause a "setting up" of the finely ground NH4NO3. When starting with a very fine granulation of NH4NO3, drying may be done first; but under all circumstances the finely pulverized NH4NO3 must be dry in its finished form prior to mixing it with the combustible ingredients.

The required degree of fineness of NH4NO3 can be obtained by a number of methods of which the following are merely illustrative:

1. By the proper control of graining or crysstallizing the NH4NO3 solution.

2. The NH4NO3 may be pulverized or ground in a suitable grinding or pulverizing mill to the point of responding to the fineness test. In doing this the necessary precautions for keeping the moisture content of the NH4NO3 low enough to prevent its caking in the mill and immediately after its leaving the mill must be exercised.

3. Microscopic crystals of NH4NO3 may be made directly at the ammonia oxidation plant by the interaction between an excess of the oxides of nitrogen and ammonia and steam. Ammonium nitrate in this form is not nearly so hygroscopic as ground, fine NH4NO3.

The coating surrounding or in intimate contact with every minute particle of NH4NO3 may consist of combustibles such as charcoal, coal of various types, carbon black, graphite, hydrocarbons, carbohydrates, resins and the like or of nitrocompounds like nitrotoluene, dinitrotoluene, nitronaphthalene, nitrobenzene, dinitrobenzene, powdered Al, and the like. The combustibles may be used singly or in various combinations.

While Al, FeSi, and T. N. T. can be used in my invention, the preferred materials are the low priced ones such as coal, mineral oil, rosin, D. N. T., and modified or treated resins.

In practice, the incorporation of the coating material with finely pulverized NH4NO3 can be undertaken in several ways. A combustible like coal in a state of very fine division can be introduced into the fine NH4NO3 and incorporated most intimately with it by a suitable mixer.

Or the finely divided NH4NO3 may be heated, and the combustible material like rosin or solid D. N. T. can then be introduced in powdered or in molten condition. However, finely divided coal or finely divided D. N. T. can also be incorporated thoroughly with the fine NH4NO3 in the cold. The combustible may also be mixed at a temperature just at its melting point so that a crisp coating of the combustible on the ammonium nitrate is obtained.

$NH_4NO_3$ and a combustible in proper proportions can be introduced jointly into a pulverizer and thus become thoroughly incorporated while being ground. Coating of the minute $NH_4NO_3$ particles can be undertaken by bringing them into the environment of a colloidal suspension of the combustible. I have also impregnated the particles of $NH_4NO_3$ with a combustible by effecting their immersion in a solution of the combustible. After a thorough incorporation has taken place, the solvent is evaporated in a suitable manner by packing the incorporated components in moistened cylindrical forms and allowing the solvent to evaporate in suitable driers.

The incorporation of the combustible with the $NH_4NO_3$ can also be done by directly adding the combustible to the $NH_4NO_3$ in the graining kettle before crystallization has occurred. By an incorporation of suitable combustibles or combinations of combustibles, a coating on the $NH_4NO_3$ may be obtained than renders the mixture water-resistant.

A few samples of mixtures that respond to the aforedescribed requirements are:

| | Percent |
|---|---|
| 1. $NH_4NO_3$ | 92–98 |
| Rosin | 2–8 |
| 2. $NH_4NO_3$ | 92–98 |
| Coal | 1–7 |
| Carbon Black | 1 |
| 3. $NH_4NO_3$ | 95 |
| Coal | 2 |
| Carbon Black | 1 |
| D. N. T. | 2 |
| 4. $NH_4NO_3$ | 96 |
| Coal | 2 |
| Carbon Black | 1 |
| Mineral Oil | 1 |

I have discovered that the minimum specifications for fineness are sufficient for mixtures 3 and 4 so that they will readily detonate with a No. 6 cap. With mixtures 1 and 2, the fineness of $NH_4NO_3$ must be reduced considerably beyond the minimum specifications given, otherwise they require at least a No. 8 cap or a stronger cap for their detonation.

In my various methods of manufacturing finely divided $NH_4NO_3$ and of incorporating it with a molecular thickness or greater of a combustible, the ease and effectiveness of its detonation with a No. 6 or No. 8 cap can be readily controlled as represented by:

1. Varying the degree of fineness of $NH_4NO_3$.
2. Varying the degree of fineness of the combustible.
3. Varying the method of coating $NH_4NO_3$ with the combustible.
4. Varying the type of combustible.
5. Varying the moisture content.

However, the aforementioned procedures may be modified in many ways depending upon the many combinations of a number of components. A few such modifications are accordingly described for the purpose of exemplification only.

$NaNO_3$ or $KNO_3$ may replace the $NH_4NO_3$ in part as the principal component.

$NH_4ClO_4$ may replace in part or in toto $NH_4NO_3$.

To any of the mixtures, in order to reduce the flame temperature for increased safety in gassy and dusty coal mines, NaCL, $NH_4CL$ and other flame cooling salts may be added.

The finest $NH_4NO_3$ used in dynamite or in other commercial explosives is as previously described, 100% through 40 mesh and not more than 50% through 100 mesh. In my invention, I aim and largely succeed in approaching colloidal fineness. This, however, is not always necessary. Under some conditions such as, when a liquid combustible is used, $NH_4NO_3$ of about 75% through 100 mesh is sufficient for satisfactory results. When the combustible is exclusively solid, then it is necessary to have the $NH_4NO_3$ and the combustible much finer. In fact, an appreciable portion should be of an air-floated fineness in order to have the mixture detonate with a No. 6 cap. With a coarser material a stronger cap is necessary for detonation.

This, however, does not mean that the finished product must remain in such a fine state. After incorporation with combustibles, there may be a consolidation or a formation of aggregates.

Under all circumstances, my explosives as manufactured in accordance with my disclosure are not only insensitive to friction, impact, and flame, but will readily shoot with a No. 6 or No. 8 cap.

The finely pulverized $NH_4NO_3$ explosive heretofore described has a density of 1.0 or less when packed under normal pressures. However, an increase in density induces a greater difficulty in detonating the material with a No. 6 or No. 8 cap since stronger initiators are necessary when the packing density is increased. But higher densities may be obtained which are likewise sensitive to a No. 6 or 8 cap by various means. One method of obtaining higher densities is by first pressing the mixture at high pressures for the purpose of materially increasing its density and by next breaking the resultant cake into small grains that can be mixed with the extremely fine material. Packing can then be obtained under normal packing pressures. The finished product thus obtained has not only an appreciably higher density, but is also sensitive to a No. 6 or No. 8 cap.

The extremely fine mixture of $NH_4NO_3$ and combustible may also be used to sensitize a coarser $NH_4NO_3$.

While the mixtures of very fine ingredients yield a product when packed at normal pressures that has a density of substantially 1.0 or less and readily shoots with a No. 6 or a No. 8 cap, yet the product may also be packed at higher pressures to produce an explosive of higher density requiring a more potent cap than No. 8.

Furthermore, my explosive can be packed in paper containers, in special water-proof containers, in metal containers or in other containers adapted for blasting purposes. Regardless of the type of container used, it must be waterproof to prevent an entrance of moisture into the explosive mixture. Such a method of packaging becomes necessary only when conditions for otherwise eliminating the humidity factor—like coating the $NH_4NO_3$ with a water-resistant material—have not been observed.

While the processes and materials as described and exemplified are the preferred embodiment of my invention, nevertheless the same may be modified in detail without departing from the spirit and the scope of my invention as defined in the annexed claims.

I claim:

1. An explosive containing $NH_4NO_3$ as the principal component, an alkali metal nitrate, and a mixture of a non-volatile organic liquid combustible and solid combustible agents in intimate admixture, said mixture containing a substantial proportion of the liquid combustible agent, the fineness of the solid components being so controlled that at least 95% passes through a 60 mesh screen and in the neighborhood of 75% passes through a 100 mesh screen and the moisture content of the said mixture of components being restricted to .20% or less so that detonation can be accomplished by a cap that need not be stronger than No. 8.

2. An explosive containing $NH_4NO_3$ as the principal component and at least one non-volatile organic liquid combustible agent in intimate admixture, the fineness of the solid components being so controlled that at least 95% passes through a 60 mesh screen and in the neighborhood of 75% passes through a 100 mesh screen and the moisture content of the said mixture of components being restricted to .20% or less so that detonation can be accomplished by a cap that need not be stronger than No. 8.

3. An explosive containing $NH_4NO_3$ as the principal component and a mixture of non-volatile organic liquid and solid combustible agents in intimate admixture, the fineness of the solid components being so controlled that at least 95% passes through a 60 mesh screen and in the neighborhood of 75% passes through a 100 mesh screen and the moisture content of the said mixture of components being restricted to .20% or less so that detonation can be accomplished by a cap that need not be stronger than No. 8.

4. An explosive containing $NH_4NO_3$ as the principal component and at least one solid combustible agent and one non-volatile organic liquid combustible agent, the fineness of the solid components being so controlled that 95% passes through a 100 mesh screen and in the neighborhood of 75% passes through a 200 mesh screen and the moisture content of the said mixture of components being so restricted that detonation can be accomplished by a cap that need not be stronger than No. 8.

5. An explosive containing $NH_4NO_3$ as the principal component and intimately mixed with a low melting combustible carbonaceous material applied in a molten state for coating, the fineness of the components being so controlled that at least 95% passes through a 60 mesh screen and in the neighborhood of 75% passes through a 100 mesh screen and the moisture content of the said components being restricted to .20% or less so that detonation is accomplished with a conventional detonating cap that need not be stronger than No. 8.

6. An explosive composition detonatable by a commercial blasting cap, comprising an intimate admixture of a substantially small proportion of a non-volatile organic liquid combustible and a predominating proportion of ammonium nitrate comminuted to a degree of fineness such that at least about 75% will pass through a 100 mesh screen; said composition being free from any ingredient that is per se sensitive to detonation by a commercial blasting cap.

JACOB BARAB.